(12) United States Patent
Hirose et al.

(10) Patent No.: US 10,475,576 B2
(45) Date of Patent: *Nov. 12, 2019

(54) DIELECTRIC COMPOSITION, DIELECTRIC ELEMENT, ELECTRONIC COMPONENT AND LAMINATED ELECTRONIC COMPONENT

(71) Applicant: TDK Electronics AG, München (DE)

(72) Inventors: Masakazu Hirose, Tokyo (JP); Tomoya Imura, Tokyo (JP); Tomohiro Terada, Tokyo (JP); Goushi Tauchi, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,664

(22) PCT Filed: Jun. 16, 2016

(86) PCT No.: PCT/EP2016/063899
§ 371 (c)(1),
(2) Date: Jan. 17, 2018

(87) PCT Pub. No.: WO2017/012798
PCT Pub. Date: Jan. 26, 2017

(65) Prior Publication Data
US 2018/0218837 A1  Aug. 2, 2018

(30) Foreign Application Priority Data

Jul. 17, 2015 (JP) .................. 2015-143389

(51) Int. Cl.
*C04B 35/475* (2006.01)
*H01G 4/12* (2006.01)
(Continued)

(52) U.S. Cl.
CPC ......... *H01G 4/1227* (2013.01); *C04B 35/475* (2013.01); *H01B 3/12* (2013.01);
(Continued)

(58) Field of Classification Search
CPC ............................ C04B 35/475; H01G 4/1227
See application file for complete search history.

(56) References Cited

U.S. PATENT DOCUMENTS 8,043,987 B2  10/2011  Chen et al.
9,530,563 B2  12/2016  Imura et al.
(Continued)

FOREIGN PATENT DOCUMENTS

CN  101284732 A  10/2008
JP  2004182532 A  7/2004
(Continued)

OTHER PUBLICATIONS

Intatha, U. et al., "Preparation of Lead-Free Piezoelectric Ceramics from (1-x)BNLT-xBT Ceramics System," Ferroelectrics, vol. 358, No. 1, XP055226762, Oct. 3, 2007, 6 pages.
(Continued)

*Primary Examiner* — Karl E Group
(74) *Attorney, Agent, or Firm* — Slater Matsil, LLP

(57) ABSTRACT

A dielectric composition, a dielectric element, an electronic component and a laminated electronic component are disclosed. In an embodiment the dielectric composition includes particles having a perovskite crystal structure including at least Bi, Na, Sr and Ti, wherein the content of the at least one element selected from La, Ce, Pr, Nd, Sm, Eu, Gd, Tb, Dy, Ho, Yb, Ba, Ca, Mg or Zn is between 0.5 molar parts and 11.1 molar parts, taking the Ti content of the dielectric composition as 100 molar parts, wherein $0.17 \leq \alpha \leq 2.83$, where $\alpha$ is the molar ratio of Bi with respect to Sr in the dielectric composition, and wherein at least some of the particles include a high-Bi phase having a Bi concentration of at least 1.2 times the mean Bi concentration of the dielectric composition as a whole.

14 Claims, 3 Drawing Sheets

(51) Int. Cl.
*H01G 4/30* (2006.01)
*H01B 3/12* (2006.01)
*H01G 4/232* (2006.01)
*H01G 4/248* (2006.01)

(52) U.S. Cl.
CPC ............ *H01G 4/12* (2013.01); *H01G 4/1218* (2013.01); *H01G 4/30* (2013.01); *C04B 2235/3203* (2013.01); *C04B 2235/3206* (2013.01); *C04B 2235/3208* (2013.01); *C04B 2235/3213* (2013.01); *C04B 2235/3224* (2013.01); *C04B 2235/3227* (2013.01); *C04B 2235/3236* (2013.01); *C04B 2235/3255* (2013.01); *C04B 2235/3284* (2013.01); *C04B 2235/3298* (2013.01); *H01G 4/232* (2013.01); *H01G 4/248* (2013.01)

(56) References Cited

U.S. PATENT DOCUMENTS

| | | | |
|---|---|---|---|
| 9,666,370 B2 | 5/2017 | Wada | |
| 2018/0211777 A1* | 7/2018 | Tauchi | C04B 35/462 |
| 2018/0211779 A1* | 7/2018 | Hirose | C04B 35/47 |
| 2018/0211781 A1* | 7/2018 | Imura | C04B 35/462 |
| 2018/0218837 A1* | 8/2018 | Hirose | H01G 4/30 |
| 2018/0218838 A1* | 8/2018 | Imura | C01G 23/006 |
| 2018/0222801 A1* | 8/2018 | Hirose | C04B 35/462 |

FOREIGN PATENT DOCUMENTS

| | | |
|---|---|---|
| JP | 2005022891 A | 1/2005 |
| JP | 2006206362 A | 8/2006 |
| JP | 2007161538 A | 6/2007 |
| JP | 2008520541 A | 6/2008 |
| JP | 2014189465 A | 10/2014 |
| WO | 2015040869 A1 | 3/2015 |
| WO | 2015060003 A1 | 4/2015 |

OTHER PUBLICATIONS

Jaita, P. et al., "Composition Range and Electrical Properties of the Morphotropic Phase Boundary in Bi0.5 (NA0.80K0.20)0.5TiO3-(Ba0.7Sr0.3)TiO3 System," Electronic Materials Letters, vol. 9, No. 4, Jul. 10, 2013, 4 pages.

Kwon, Y.H. et al., "(1-x)(Bi,Na)TiO3-x(Ba,Sr)TiO3 Lead-Free Piezoelectric Ceramics for Piezoelectric Energy Harvesting," Journal of the Korean Physical Society, vol. 66, No. 7, Apr. 16, 2015, 5 pages.

* cited by examiner

DIELECTRIC COMPOSITION, DIELECTRIC ELEMENT, ELECTRONIC COMPONENT AND LAMINATED ELECTRONIC COMPONENT

This patent application is a national phase filing under section 371 of PCT/EP2016/063899, filed Jun. 16, 2016, which claims the priority of Japanese patent application 2015-143389, filed Jul. 17, 2015, each of which is incorporated herein by reference in its entirety.

TECHNICAL FIELD

The present invention relates to a dielectric composition and a dielectric element comprising the same, and to an electronic component and a laminated electronic component. More specifically, the present invention relates to a dielectric composition, a dielectric element, an electronic component and a laminated electronic component which are used for applications with a relatively high rated voltage.

BACKGROUND

Recent years have seen increasing demand for miniaturization and increased reliability of dielectric elements as electronic circuits reach higher densities. Miniaturization of electronic components such as laminated ceramic capacitors, together with increased capacity and higher reliability are rapidly progressing, while the applications of electronic components such as laminated ceramic capacitors are also expanding. Various characteristics are required as these applications expand.

For example, there is a growing shift from silicon to silicon carbide in semiconductors used for circuits in AC-DC inverters and DC-DC converters for motor vehicles. There is a need for even greater reliability in capacitors used around silicon carbide semiconductors. Specifically, there is a need for a high dielectric constant when a high DC bias is applied. Furthermore, there is also a need for a long high-temperature load lifespan in order to increase the lifespan when a high voltage is applied under a high temperature. In addition, there is simultaneously a need for high mechanical strength in order to prevent cracking and splintering etc. during production of the dielectric material and mounting on a substrate.

In order to respond to these requirements, dielectric compositions having barium titanate ($BaTiO_3$) as the main component are often investigated and used in general. However, there are problems with electronic components which have dielectric layers comprising a conventional dielectric composition having $BaTiO_3$ as the main component in that the dielectric constant decreases when a high DC bias is applied. It is difficult to avoid this problem because $BaTiO_3$ is a ferroelectric material. In addition, the higher the DC bias, the more the dielectric constant tends to decrease. When such electronic components are used for applications involving high DC bias application it is therefore necessary to anticipate the amount of reduction in the dielectric constant and to use a plurality of the electronic components connected in parallel in order to maintain the required capacitance or dielectric constant. Methods for connecting a plurality of the electronic components in parallel are a particular problem in terms of high cost.

Furthermore, a laminated ceramic capacitor which has dielectric layers comprising a conventional dielectric composition having $BaTiO_3$ as the main component has a relatively good high-temperature load lifespan. However, it is anticipated that the environments under which electronic components are used will become even more harsh in the future so a further improvement in the high-temperature load lifespan would be desirable.

When a conventional dielectric composition having $BaTiO_3$ as the main component is used for applications under a low DC bias of several volts or less, the field intensity applied to the dielectric layers is small, so the thickness of the dielectric layers can be set to a sufficiently thin level that breakdown does not occur. It is therefore possible to reduce the size of the dielectric element. In addition, there are also very few cases in which cracking etc. becomes a problem because of external stress or the like to which the electronic component is subjected during production of the dielectric material and mounting on a substrate. However, for applications involving usage under a high DC bias of several hundred volts or greater, the dielectric layers must be sufficiently thick to ensure safety. The dielectric material therefore tends to be larger and heavier for applications involving usage under a high DC bias. The mechanical strength required also increases as a result. The dielectric material may crack or splinter if it is dropped during production because it is not possible to ensure adequate mechanical strength which is commensurate with the size and weight of the dielectric material.

In order to solve these problems, Japanese Patent Application JP 2006 206362 describes a dielectric porcelain having barium titanate as the main component and containing Ca, Sr, Mg, Mn and rare earth elements, and characterized by a core-shell structure in which the Ca concentration is greater at the particle surface than at the centre of the particle, and the Sr, Mg, Mn and rare earth elements are unevenly distributed at the particle surface.

Furthermore, Japanese Patent Application JP 2005 22891 describes a dielectric porcelain comprising both perovskite barium titanate crystal grains in which part of the B site is substituted with Zr (BTZ-type crystal grains), and perovskite bismuth sodium titanate crystal grains in which part of the A-site is substituted with Sr (BNST-type crystal grains). That dielectric porcelain is characterized by a core-shell structure in which Mg, Mn and at least one rare earth element are present in the grain boundary phase between the BTZ-type crystal grains and the BNST-type crystal grains, and the mean particle size of both the BTZ-type crystal grains and the BNST-type crystal grains is 0.3-1.0 μm.

Dielectric porcelain comprising $BaTiO_3$ as the main component and having a core-shell structure such as that described in Japanese Patent Application JP 2006 206362 has a relatively high dielectric constant value of 2500 or greater at 20° C. when a DC bias is not applied. However, a sufficiently good value is not exhibited for the rate of change in the dielectric constant or the rate of change in capacitance when a DC bias of 5 V/μm is applied. Furthermore, a sufficiently good value is not exhibited for the high-temperature load lifespan. In addition, there is no mention of the mechanical strength.

On the other hand, the ceramic composition described in Japanese Patent Application JP 2005 22891 has a relatively high dielectric constant when a DC bias is not applied, and the DC bias characteristics when a DC bias of 3 V/μm is applied are also less than −20%. However, the value cannot be considered sufficient for use under a high voltage, such as in a DC-DC converter or AC-DC inverter for a motor vehicle. Furthermore, there is no mention of the high-temperature load lifespan or mechanical strength.

SUMMARY OF THE INVENTION

Embodiments provide a dielectric composition which can be used in locations where a high voltage is applied and for applications with a relatively high rated voltage, which has a good dielectric constant when a DC bias is applied and good DC bias characteristics, and which also has a good high-temperature load lifespan and good mechanical strength. Further embodiments provide a dielectric element comprising the dielectric composition, an electronic component and a laminated electronic component.

In various embodiments the dielectric composition comprises particles having a perovskite crystal structure including at least Bi, Na, Sr and Ti, wherein the dielectric composition includes at least one selected from among La, Ce, Pr, Nd, Sm, Eu, Gd, Tb, Dy, Ho, Yb, Ba, Ca, Mg and Zn, wherein the content of the at least one selected from among La, Ce, Pr, Nd, Sm, Eu, Gd, Tb, Dy, Ho, Yb, Ba, Ca, Mg and Zn is between 0.5 molar parts and 11.1 molar parts, taking the Ti content of the dielectric composition as 100 molar parts, wherein $0.17 \leq \alpha \leq 2.83$, where $\alpha$ is the molar ratio of Bi with respect to Sr in the dielectric composition, wherein at least some of the particles include a high-Bi phase having a Bi concentration of at least 1.2 times the mean Bi concentration of the dielectric composition as a whole, and wherein the total surface area of the high-Bi phase within the particles in the cross section of the dielectric composition is between 0.1% and 15% of the total surface area of the particles.

The dielectric composition according to embodiments of the present invention has the constitution described above, and as a result the dielectric constant when a DC bias is applied and the DC bias characteristics are improved, and the high-temperature load lifespan and mechanical strength are also improved at the same time.

The dielectric composition according to embodiments of the present invention is such that the total content of Bi included in the high-Bi phase within the particles is, as an atomic ratio, between 1.15 and 2.15 times the total content of Bi included in the portion within the particles outside the high-Bi phase. By virtue of this feature, the dielectric constant when a DC bias is applied, the DC bias characteristics, the high-temperature load lifespan and/or the mechanical strength are further improved.

A dielectric element according to embodiments of the present invention is provided with the abovementioned dielectric composition.

An electronic component according to embodiments of the present invention is provided with a dielectric layer comprising the abovementioned dielectric composition.

A laminated electronic component according to embodiments of the present invention has a laminated portion formed by alternately laminating an internal electrode layer and a dielectric layer comprising the abovementioned dielectric composition.

Embodiments of the present invention will be described below with reference to the figures. It should be noted that the present invention is not limited to the following embodiments. Furthermore, the constituent elements described below include elements which can be readily envisaged by a person skilled in the art and also elements which are substantially the same. In addition, the constituent elements described below may be combined, as appropriate.

DETAILED DESCRIPTION OF ILLUSTRATIVE EMBODIMENTS

Figure 1:
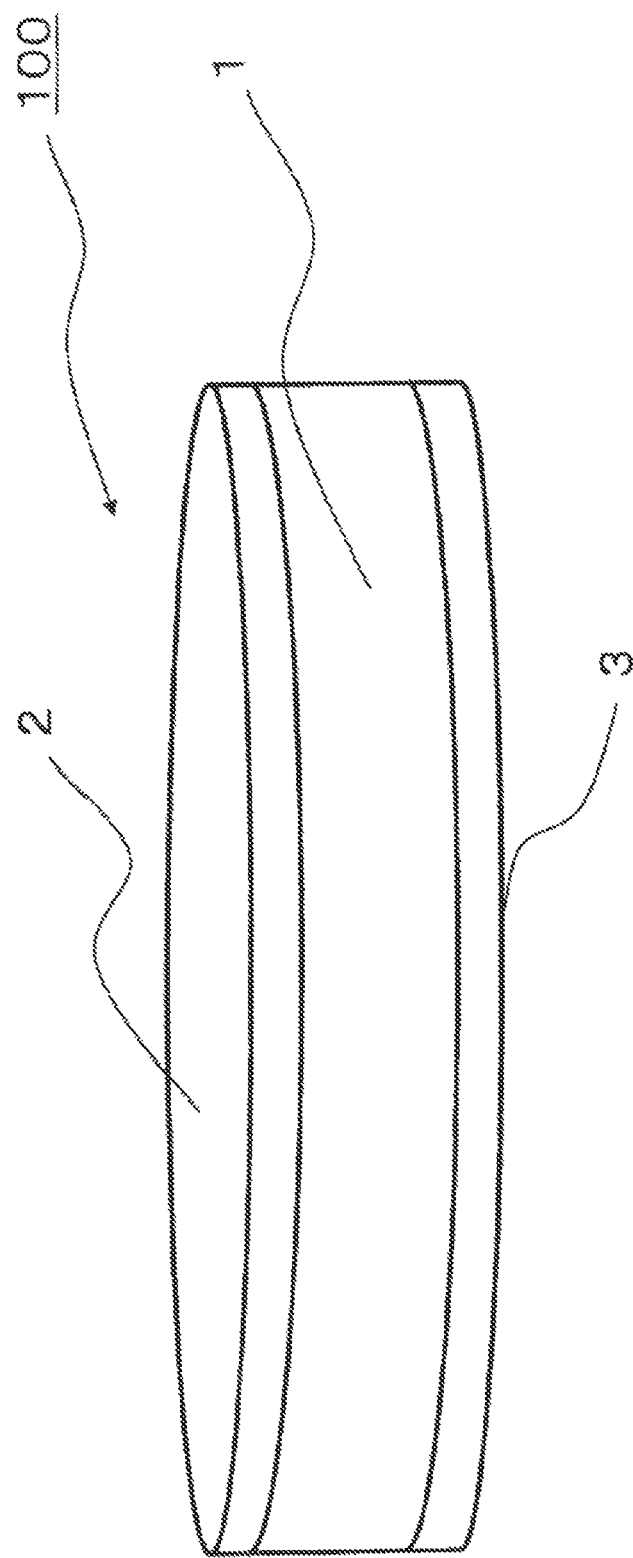
FIG. 1 is a schematic diagram of a ceramic capacitor according to an embodiment of the present invention.

FIG. 1 is a schematic diagram of a ceramic capacitor according to an embodiment of the present invention.

As shown in FIG. 1, a ceramic capacitor 100 according to an embodiment of the present invention comprises a disc-shaped dielectric body 1 and a pair of electrodes 2, 3. The single-layer ceramic capacitor 100 is obtained by forming the electrodes 2, 3 on both surfaces of the dielectric body 1. There is no particular limitation as to the shapes of the dielectric body 1 and the electrodes 2, 3. Furthermore, there is no particular limitation as to the dimensions thereof either, and suitable dimensions should be set in accordance with the application.

The dielectric body 1 comprises a dielectric composition according to this embodiment. There is no particular limitation as to the material of the electrodes 2, 3. For example, Ag, Au, Cu, Pt, Ni or the like may be used, but other metals may also be used.

Figure 2:
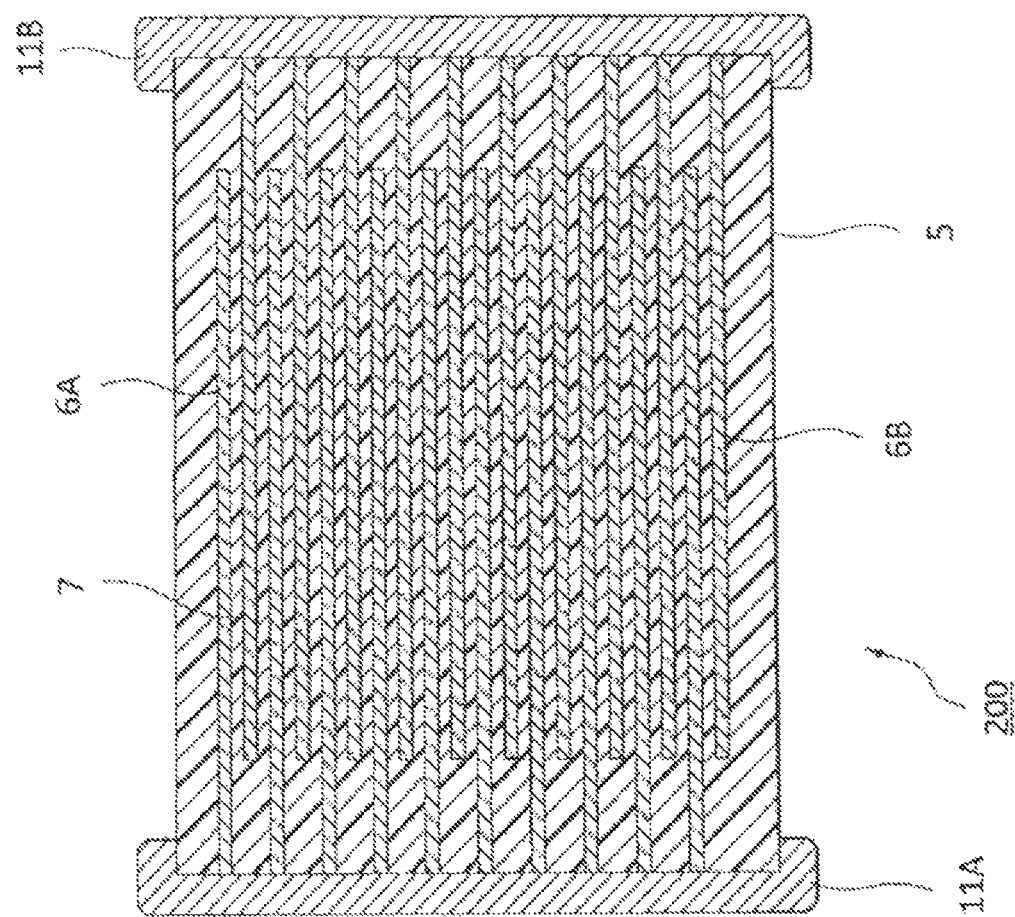
FIG. 2 is a view in cross section of a laminated ceramic capacitor according to a further embodiment of the present invention.

FIG. 2 is a schematic cross-sectional diagram of a laminated ceramic capacitor according to a different embodiment of the present invention.

As shown in FIG. 2, a laminated ceramic capacitor 200 according to a different embodiment of the present invention comprises a capacitor element main body 5 having a structure in which dielectric layers 7 and internal electrode layers 6A, 6B are alternately stacked. A pair of terminal electrodes 11A, 11B which conduct, respectively, with the internal electrode layers 6A, 6B alternately arranged inside the element main body 5 are formed at both ends of the element main body 5. There is no particular limitation as to the shape of the element main body 5, but it is normally a cuboid shape. Furthermore, there is no particular limitation as to the dimensions thereof, and suitable dimensions should be set in accordance with the application.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

There is no particular limitation as to the material of the internal electrode layers 6A, 6B. For example, a metal such as Au, Pt, Ag, Ag—Pd alloy, Cu or Ni etc. may be used, but it is also possible to use other metals.

The terminal electrodes 11A, 11B are provided at the end surfaces of the laminated body 5 in contact with the ends of the internal electrode layers 6A, 6B which are exposed at said end surfaces. By virtue of this structure, the terminal electrodes 11A, 11B are electrically connected to the internal electrode layers 6A, 6B, respectively. The terminal electrodes 11A, 11B may comprise a conductive material having Ag, Au, Cu or the like as the main component thereof. There is no particular limitation as to the thickness of the terminal electrodes 11A, 11B. The thickness thereof is appropriately set in accordance with the application and the size of the laminated dielectric element, among other things. The thickness of the terminal electrodes 11A, 11B may be set at 10-50 μm, for example.

The dielectric layers 7 comprise the dielectric composition according to this embodiment. The thickness of each dielectric layer 7 may be freely set and there is no particular limitation. The thickness may be set at 1-100 μm, for example.

Here, the dielectric composition according to this embodiment has a perovskite crystal structure containing at least Bi, Na, Sr and Ti, and comprises at least one selected from among La, Ce, Pr, Nd, Sm, Eu, Gd, Tb, Dy, Ho, Yb, Ba, Ca, Mg and Zn (also referred to below as an "auxiliary component").

The dielectric composition having a perovskite crystal structure is a polycrystalline material comprising, as the main phase, a perovskite compound represented by the general formula $ABO_3$, where A includes at least one selected from Bi, Na and Sr, and B includes at least Ti.

If the whole of A is taken as 100 at. %, the proportion of Bi, Na, Sr contained in A is preferably a total of at least 80 at. %. Furthermore, if the whole of B is taken as 100 at. %, the proportion of Ti contained in B is preferably at least 80 at. %.

Furthermore, a dielectric composition 300 according to this embodiment is preferably such that $0.17 \leq \alpha \leq 2.83$, where α is the molar ratio of Bi with respect to Sr in the dielectric composition. If a is excessively small, there tends to be a deterioration in the dielectric constant. If α is excessively large, there tends to be a deterioration in one or more of the dielectric constant when a DC bias is applied, the DC bias characteristics, the high-temperature load lifespan, and the mechanical strength.

In addition, the dielectric composition 300 contains between 0.5 molar parts and 11.1 molar parts of the auxiliary component, where the Ti content of the dielectric composition is taken as 100 molar parts. If the auxiliary component content is excessively small, the mean particle size which will be described later tends to be excessively large and there tends to be a deterioration in the DC bias characteristics which will be described later. If the auxiliary component content is excessively large, there tends to be a reduction in the dielectric constant.

Figure 3:
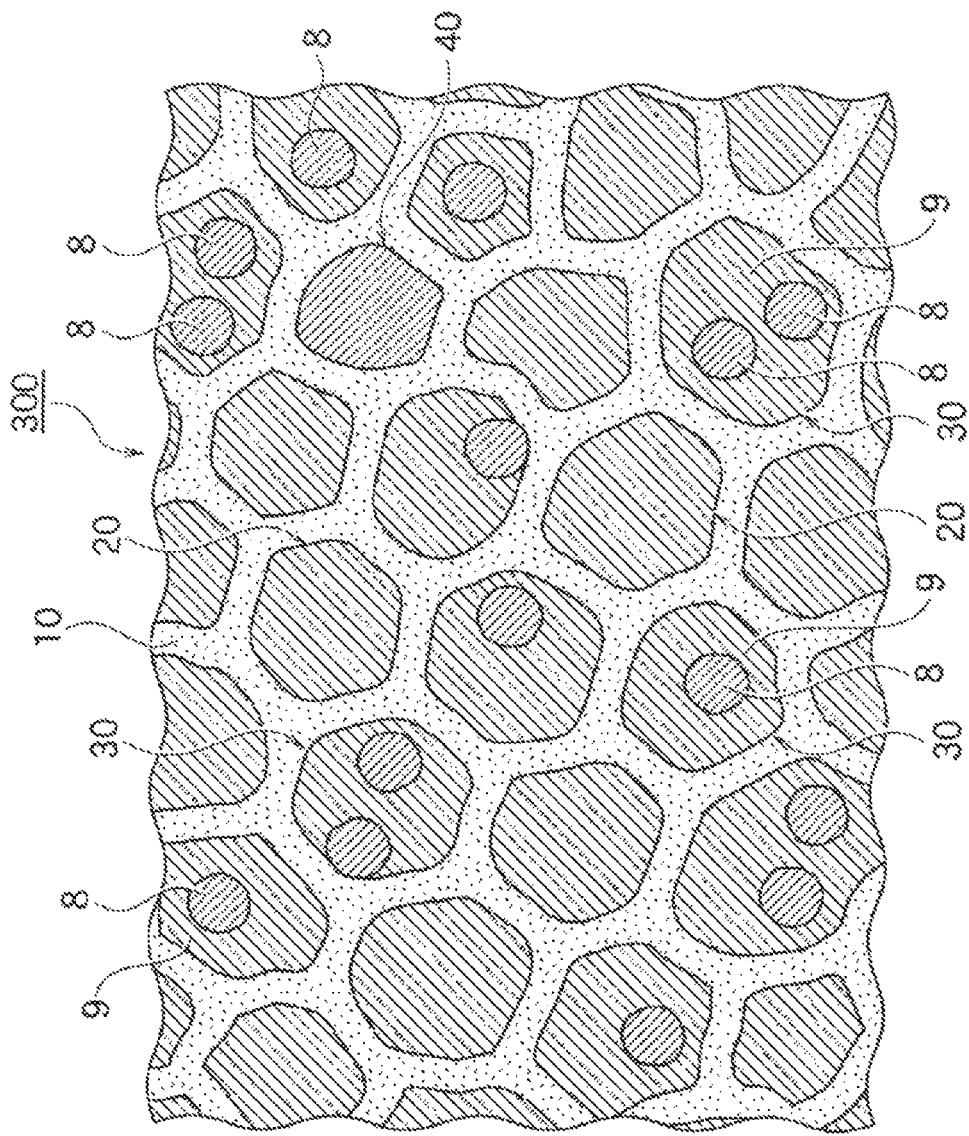
FIG. 3 is a schematic diagram of particles in a dielectric composition according to another embodiment of the present invention.

FIG. 3 is a schematic diagram showing particles (sintered particles) of the dielectric composition 300 forming the dielectric body 1 of the single-layer ceramic capacitor 100 and the dielectric layers 7 of the laminated ceramic capacitor 200, for example. The dielectric composition 300 firstly comprises sintered particles and a grain boundary 10. The sintered particles are categorized as sintered particles 20 not including a high-Bi phase, sintered particles 30 including a high-Bi phase, and sintered particles 40 comprising only a high-Bi phase. Here, the sintered particles 30 including a high-Bi phase comprise a first phase 8 comprising a high-Bi phase, and a second phase 9 comprising a portion within the sintered particles outside the high-Bi phase. The high-Bi phase refers to a phase having a Bi concentration of at least 1.2 times the mean Bi concentration of the dielectric composition as a whole.

There is no limit as to the number of first phases 8 included in the sintered particles 30 including a high-Bi phase. There is often only a single first phase 8 included in a single sintered particle 30, but two or more first phases 8 may equally be included. It should be noted that there is no particular limitation as to whether the sintered particles 30 including a high-Bi phase are sintered particles in which the first phase 8 is completely surrounded by the second phase 9 without making contact with the grain boundary 10, or sintered particles in which part of the first phase 8 is in contact with the grain boundary 10 and is incompletely surrounded by the second phase 9.

It should be noted that it is possible to appropriately control the amount of formation of the sintered particles 30 including a high-Bi phase and the sintered particles 40 comprising only a high-Bi phase by means of the make-up of the dielectric composition and the method for producing same, and also the baking conditions etc. For example, if particles having a large particle size are used in a starting material powder, the sintered particles 30 including a high-Bi phase and the sintered particles 40 comprising only a high-Bi phase tend to be readily formed, while if the baking temperature is increased, the sintered particles 30 including a high-Bi phase and the sintered particles 40 comprising only a high-Bi phase tend not to be readily formed.

There is no particular limitation as to the method for distinguishing the sintered particles and the grain boundary 10, or to the method for distinguishing the first phase 8 and the second phase 9. For example, it is possible to distinguish the sintered particles and the grain boundary 10 by observing a cross section of the sintered dielectric composition 300 by means of scanning transmission electron microscopy (STEM). Furthermore, it is possible to distinguish the first phase 8 and the second phase 9 by means of analysis using energy dispersive X-ray spectroscopy (EDS). Furthermore, the second phase 9 contains at least Na, Bi and Ti.

Here, the dielectric composition 300 according to this embodiment is such that the total surface area of the high-Bi phase (first phase 8) included in the sintered particles 30 including a high-Bi phase and the sintered particles 40 comprising only a high-Bi phase is between 0.1% and 15% with respect to the surface area of all the sintered particles. If the surface area of the first phase 8 is excessively small, there tends to be a deterioration in the dielectric constant when a DC bias is applied (to be described later). If the surface area of the first phase 8 is excessively large, there tends to be a deterioration in the mechanical strength. It should be noted that the surface area of all the sintered particles refers to the surface area excluding the grain boundary 10. However, in actual fact the surface area of the grain boundary 10 is often small enough in comparison to the surface area of all the particles that it can be ignored, so the surface area of the observation field as a whole (the surface area of the dielectric composition 300 as a whole) is often deemed to be the surface area of all the particles.

This embodiment is advantageous in that it makes it possible to obtain a dielectric composition for which the dielectric constant when a DC bias is applied, the DC bias characteristics, the high-temperature load lifespan and the mechanical strength are all favourable. It should be noted that the high-temperature load lifespan is sometimes also referred to as the "mean time to failure" (MTTF). Furthermore, there is no particular limitation as to the method for determining the mechanical strength, and a method in which the transverse rupture strength is measured may be used, for example.

In addition, the dielectric composition is preferably such that $1.15 \leq \beta \leq 2.15$, where β is the total content of Bi atoms included in the first phase 8 with respect to the total content of Bi atoms included in the second phase 9 (total content of Bi atoms in the high-Bi phase included in the sintered particles/total content of the Bi atoms outside the high-Bi phase included in the sintered particles). When β is in the abovementioned range, the dielectric constant when a DC bias is applied and the mechanical strength tend to be improved. An example of a method for measuring β will be described below. It should be noted that there is no particular limitation as to the method for measuring β.

The composition of each first phase 8 in the sintered particles distinguished by STEM and EDS was analysed, preferably at 10 points or more, and the mean value of the Bi concentration (atomic concentration) at each point was calculated. The Bi content of the first phase 8 was obtained by multiplying the surface area of the first phase 8 by said mean value. The composition of each second phase 9 was analysed in the same way, preferably at 10 points or more, and the mean value of the Bi concentration (atomic concentration) at each measurement point was calculated. The Bi content of the second phase 9 was obtained by multiplying the surface area of the second phase 9 by said mean value.

Preferably, β can be calculated by taking at least 100 sintered particles and calculating the total of the Bi content of the first phase 8 present in the sintered particles and the total of the Bi content in the second phase 9 present in the sintered particles.

The high-Bi phase may be included anywhere in the dielectric composition, or the high-Bi phase may be included at the grain boundary 10.

The sintered particles 20 not including a high-Bi phase and the sintered particles 40 comprising only a high-Bi phase may not be apparent in the abovementioned cross section or they may equally be entirely absent from the dielectric composition 300.

It should be noted that the auxiliary component may be present in any of the first phase 8, second phase 9 and grain boundary 10.

An example of a method for producing the laminated ceramic capacitor shown in FIG. 2 will be described below.

There is no particular limitation as to the method for producing the laminated ceramic capacitor according to the present invention. For example, it is produced in the same way as a conventional laminated ceramic capacitor, namely by preparing a green chip using a normal sheet method or printing method employing a paste, baking the green chip and then printing or transcribing external electrodes and then baking. The method for producing the laminated ceramic capacitor will be described in specific terms below.

There is no particular limitation as to the type of paste for the dielectric ceramic layers. For example, said paste may be an organic paint comprising a mixture of a dielectric starting material and an organic vehicle, or it may be an aqueous paint comprising a mixture of a dielectric starting material and an aqueous vehicle.

For the dielectric starting material, it is possible to use a metal contained in the abovementioned dielectric composition, for example, an oxide of a metal selected from the group consisting of Bi, Na, Sr, Ti, La, Ce, Pr, Nd, Sm, Eu, Gd, Tb, Dy, Ho, Yb, Ba, Ca, Mg, and Zn, or a mixture thereof, or a composite oxide may be used. In addition, the dielectric starting material may be appropriately selected from various types of compounds which form the abovementioned oxides or composite oxides as a result of baking, e.g., carbonates, oxalates, nitrates, hydroxides and organometallic compounds etc. and these may be mixed for use.

When the paste for the dielectric layers is an organic paint, the dielectric starting material and an organic vehicle in which a binder or the like is dissolved in an organic solvent should be mixed. There is no particular limitation as to the binder which is used in the organic vehicle, and it may be appropriately selected from various conventional binders such as ethyl cellulose and polyvinyl butyral. Furthermore, there is no particular limitation as to the organic solvent which is used in the organic vehicle, and it may be appropriately selected from various types of organic solvents such as terpineol, butyl carbitol, acetone and toluene, in accordance with the method which is used, namely the printing method or sheet method etc.

Furthermore, when the paste for the dielectric layers is an aqueous paint, the dielectric starting material and an aqueous vehicle in which a water-soluble binder and a dispersant etc. are dissolved in water should be mixed. There is no particular limitation as to the water-soluble binder which is used in the aqueous vehicle, and said water-soluble binder may be appropriately selected from various types of binders such as polyvinyl alcohol, cellulose and water-soluble acrylic resin.

The paste for the internal electrode layers is prepared by mixing a conductive material comprising metals such as Au, Pt, Ag, Ag—Pd alloy, Cu or Ni, or various types of oxide which form the conductive material after baking, organometallic compounds, resinates, and the like, with the abovementioned organic vehicle or aqueous vehicle. The paste for the external electrodes may be prepared in the same way as the paste for the internal electrode layers.

When an organic vehicle is used to prepare the abovementioned pastes, there is no particular limitation as to the content of said organic vehicle. For example, the binder may be present in an amount of the order of 1-5 wt % and the organic solvent may be present in an amount of the order of 10-50 wt %. Furthermore, the pastes may contain additives selected from various types of dispersants, plasticizers, dielectrics, and insulators etc., as required. The total content of these additives is preferably no greater than 10 wt %.

When a printing method is used, the paste for the dielectric layers and the paste for the internal electrode layers are printed in layers on a substrate made of polyethylene terephthalate (PET) or the like and cut to a predetermined shape, after which they are peeled from the substrate to form a green chip. Furthermore, when the sheet method is used, a green sheet is formed using the paste for the dielectric layers, and the paste for the internal electrode layers is printed on the green sheet, after which the green sheets are stacked to form a green chip.

Before the green chip is baked, a debinding treatment is performed. There is no particular limitation as to the conditions of the debinding treatment and it should be carried out under normal conditions.

The debinding treatment is preferably carried out under a reducing atmosphere when a base metal alone or an alloy comprising a base metal, such as Cu or Cu alloy, is used for the conductive material of the internal electrode layers. There is no particular limitation as to the type of reducing atmosphere, and it is possible to use humidified $N_2$ gas or a mixed gas comprising humidified $N_2$ and $H_2$, among others.

There is no particular limitation as to the temperature increase rate, holding temperature and temperature holding time in the debinding treatment. The temperature increase rate is preferably 0.1-100° C./hr and more preferably 1-10° C./hr. The holding temperature is preferably 200-500° C. and more preferably 300-450° C. The temperature holding time is preferably 1-48 hours and more preferably 2-24 hours. The organic component such as the binder component is preferably removed down to around 300 ppm by means of the debinding treatment, and more preferably removed down to around 200 ppm.

The atmosphere when the green chip is baked to obtain the capacitor element main body should be appropriately determined in accordance with the type of conductive material in the paste for the internal electrode layers.

When a base metal alone or an alloy comprising a base metal, such as Cu or Cu alloy, is used as the conductive material in the paste for the internal electrode layers, the oxygen partial pressure in the baking atmosphere is preferably set at $10^{-6}$ to $10^{-8}$ atm. By setting the oxygen partial pressure at $10^{-8}$ atm or greater, it is possible to restrict degradation of the components forming the dielectric layers and to restrict a reduction in the resistivity. Furthermore, by setting the oxygen partial pressure at $10^{-6}$ atm or less, it is possible to restrict oxidation of the internal electrode layers.

Furthermore, the holding temperature during baking is 900-1400° C., preferably 900-1100° C., and more preferably 950-1050° C. By setting the holding temperature at 900° C. or greater, this makes densification more likely to progress adequately due to baking. Furthermore, when the holding temperature is set at 1100° C. or less, this facilitates suppressing diffusion of the various materials forming the internal electrode layers and abnormal sintering of the internal electrode layers. By suppressing abnormal sintering of the internal electrode layers, this facilitates preventing breakage of the internal electrodes. By suppressing diffusion of the various materials forming the internal electrode layers, this facilitates preventing deterioration of the DC bias characteristics.

Furthermore, there is no particular limitation as to the baking atmosphere. The baking atmosphere is preferably a reducing atmosphere so as to restrict oxidation of the internal electrode layers. There is no particular limitation as to the atmospheric gas. A mixed gas comprising $N_2$ and $H_2$ which is humidified is preferably used as the atmospheric gas, for example. Furthermore, there is no particular limitation as to the baking time.

Annealing (reoxidation) may be carried out after the baking during the production of the laminated ceramic capacitor according to this embodiment, but an atmosphere in which the dielectric layers are oxidized and the internal electrode layers are not oxidized is preferred. Humidified $N_2$ gas or a mixed gas comprising humidified $N_2$ and $H_2$ etc. may be used, for example.

A wetter or the like should be used in order to humidify the $N_2$ gas or the mixed gas comprising $N_2$ and $H_2$ etc. in the abovementioned debinding treatment, baking and annealing. In this case, the water temperature is preferably around 20-90° C.

The debinding treatment, baking and annealing may be carried out successively or independently. When these processes are performed successively, the following procedure is preferred, namely that the debinding treatment is performed, after which the atmosphere is modified without cooling and then baking is carried out by raising the temperature to the holding temperature for baking. On the other hand, when these processes are performed independently, the following procedure is preferred, namely that during baking the temperature is raised under an $N_2$ gas atmosphere to the holding temperature for the debinding treatment, after which the atmosphere is modified and temperature increase is further continued, and then after baking cooling is performed to the holding temperature for the debinding treatment, after which the atmosphere is once again modified to an $N_2$ gas atmosphere and cooling is further continued. It should be noted that the abovementioned $N_2$ gas may or may not be humidified.

The end surfaces of the capacitor element main body obtained in this way are polished by means of barrel polishing or sandblasting, for example, the paste for the external electrodes is printed or transcribed thereon, baking is carried out and the external electrodes are formed. The paste for the external electrodes is preferably baked at 600-800° C. for around 10 minutes to 1 hour under a humidified mixed gas comprising $N_2$ and $H_2$, for example. A coating layer is then formed by means of plating or the like on the external electrode surface, as required.

Furthermore, the ceramic capacitor 100 shown in FIG. 1 can be produced using a conventional method for producing a ceramic capacitor.

A ceramic capacitor and a laminated ceramic capacitor according to an embodiment of the present invention were described above. The dielectric composition according to the present invention simultaneously has a high dielectric constant when a high DC bias is applied, and also has good DC bias characteristics, high reliability and high mechanical strength, so said dielectric composition can be advantageously used for medium- and high-voltage capacitors with a relatively high rated voltage, for example.

Furthermore, the present invention is not limited to the abovementioned embodiments. For example, the dielectric layer comprising the dielectric composition according to the present invention may also be used as a dielectric element or the like in a semiconductor device. Furthermore, according to the present invention, a conventional configuration may be freely used, apart from the make-up of the dielectric composition. Furthermore, the calcined powder may be produced by means of a known method such as hydrothermal synthesis when the ceramic capacitor is produced, for example.

The dielectric element, electronic component and laminated electronic component according to the present invention are advantageously used in a location where a relatively high rated voltage is applied. For example, they may be advantageously used in a power supply circuit having a high rated voltage, such as in a DC-DC converter or an AC-DC inverter, for example.

The present invention makes it possible to provide a dielectric composition simultaneously having a dielectric constant of 1000 or greater when a DC bias of 5 kV/mm is applied, DC bias characteristics of −20% to +20%, a high-temperature load lifespan of 20 hours or greater when a DC voltage of 50 V/µm is applied at 150° C., and a transverse rupture strength of 160 MPa or greater, and also a dielectric element comprising said dielectric composition, an electronic component and a laminated electronic component.

In addition, the dielectric element, electronic component and laminated electronic component according to the present invention are also of use in a smoothing capacitor or a snubber capacitor for circuit protection for which there is a need for a high dielectric constant when a high DC bias is applied.

In addition, the dielectric composition according to the present invention does not contain lead. The inventive dielectric composition, dielectric element, electronic component and laminated electronic component are therefore also superior from an environmental point of view.

The present invention will be described below in further detail with the aid of exemplary embodiments and comparative examples. However, the present invention is not limited by the following exemplary embodiments. It should be noted that the DC field applied to the dielectric composition, dielectric element, electronic component and laminated electronic component is referred to as a DC (direct current) bias. Furthermore, application of the DC bias causes a change in the dielectric constant and capacitance of the dielectric composition etc., and the rate of change in the dielectric constant and the capacitance before and after application of the DC bias is referred to as the DC bias characteristics.

(Exemplary Embodiments 1-18 and Comparative Examples 1-3)

The following were prepared as starting materials: bismuth oxide ($Bi_2O_3$), sodium carbonate ($Na_2CO_3$), strontium carbonate ($SrCO_3$), barium carbonate ($BaCO_3$), calcium carbonate ($CaCO_3$), magnesium carbonate ($MgCO_3$), zinc oxide (ZnO), lanthanum hydroxide ($La(OH)_3$), neodymium oxide ($Nd_2O_3$), samarium oxide ($Sm_2O_3$), gadolinium oxide ($Gd_2O_3$) and titanium oxide ($TiO_2$).

The abovementioned starting material powders were weighed out in such a way that the baked dielectric compositions had the make-up shown in table 1.

The weighed starting material powders were then wet-mixed using a ball mill, after which the resulting mixtures were calcined for 2 hours under the air at 750° C.-850° C. to obtain calcined material. The resulting calcined material was then wet-ground using a ball mill to obtain calcined powders.

An organic solvent and an organic vehicle were then added to the calcined powders, the material was wet-mixed using a ball mill and paste for dielectric layers was prepared. At the same time, Ag powder, Ag—Pd alloy powder or Cu powder was mixed with an organic vehicle as a conductive material powder, and various pastes for internal electrode layers comprising Ag, Ag—Pd alloy or Cu were prepared. The paste for dielectric layers was then moulded into sheets by means of a sheet-moulding method.

The paste for the internal electrode layers was coated on the ceramic green sheets by means of screen printing to print the internal electrode layers. The ceramic green sheets on which the internal electrode layers had been printed were then stacked, after which they were cut into blocks, whereby laminated green chips were prepared. The laminated green chips were subjected to debinding at 300° C.-500° C. to remove the organic component down to around 300 ppm. After the debinding, baking was carried out under the atmosphere or under a reducing atmosphere at a baking temperature of 900-1400° C. The baking time was varied as appropriate. A mixed gas comprising humidified $N_2$ and $H_2$ was used as the atmospheric gas when baking was carried out under a reducing atmosphere.

After the baking, the exposed surfaces of the internal electrodes of the resulting laminated ceramic baked articles were polished, a paste for the external electrodes having Ag or Cu as a conductive material was applied thereto, and laminated ceramic capacitors were obtained.

The size of the resulting laminated ceramic capacitors was 3.2 mm×1.6 mm×0.6 mm, the thickness of the dielectric layers was 20 μm, and the thickness of the internal electrode layers was 1.5 μm. Four dielectric layers were interposed between the internal electrode layers.

Auxiliary Component Content and Molar Ratio α of Bi with Respect to Sr

It should be noted that when the dielectric layers of the laminated ceramic baked articles were dissolved by means of a solvent and analysed by means of ICP optical emission spectroscopy, it was confirmed that the composition of the dielectric layers such as the auxiliary component content and molar ratio α of Sr with respect to Bi was the same as in the compositions shown in table 1.

A cross section at the intersection of the internal electrodes was cut from the laminated ceramic capacitors obtained and the crystal structure of the dielectric layers at that cross section was measured and analysed by means of X-ray diffraction (Rigaku Corporation; RINT-2500). As a result, it was confirmed that the dielectric layers had a perovskite crystal structure in all of the exemplary embodiments and comparative examples.

The abovementioned cross sections were then cut into flakes by means of a gallium ion beam to prepare samples for cross-sectional observation.

The resulting samples for cross-sectional observation and the particles present in those cross sections were observed by means of scanning transmission electron microscopy (STEM; JEM-2100F; JEOL). It should be noted that the observation field was 5 μm×5 μm and the magnification was 40 000 times. Furthermore, a plurality of observation fields were set in such a way that it was possible to select from the plurality of observation fields 100 particles for which it could be confirmed that the whole of each particle was surrounded by a grain boundary.

In addition, element mapping was performed by means of energy dispersive X-ray spectroscopy (EDS) in the same observation fields and the X-ray spectrum of elemental Bi was measured. The mean concentration of elemental Bi contained in the whole observation field was calculated from the resulting X-ray spectrum. The elemental Bi mapping image was then subjected to image processing in such a way as to distinguish the phase in which the concentration of elemental Bi was at least 1.2 times the mean concentration (high-Bi phase), and the other phase. The high-Bi phase present within the particles was the first phase, and the portion within the particles outside the high-Bi phase was the second phase.

Total Surface Area of High-Bi Phase with Respect to Total Surface Area of Particles S1+S2=S3 was established in the 100 particles, where S1 is the surface area occupied by the high-Bi phase (first phase), S2 is the surface area occupied by the portion outside the high-Bi phase (second phase), and S3 is the surface area of the whole particle. S1, S2 and S3 were calculated by selecting the respective regions, counting the number of pixels occupying each region, and multiplying the result by the surface area per pixel. The proportion (%) of the surface area S1 of the high-Bi phase with respect to the surface area S3 of the whole particle was calculated by means of the following formula (1).

$$(S1/S3) \times 100 \qquad \text{Formula (1)}$$

It should be noted that in the exemplary embodiments, the experimental results for the abovementioned 100 particles were deemed to be equal to the experimental results for the dielectric composition as a whole.

Total Bi Content β Included in the First Phase

The composition of the first phase included in the abovementioned 100 particles was analysed. 10 or more measurement points were set for a single first phase. The Bi content included in the first phase was calculated by multiplying the mean value of the Bi concentration (atomic concentration) at the measurement points in the single first phase by the surface area of said single first phase in which the measurement points were included. The Bi content was then calculated for each first phase included in the abovementioned 100 particles and the Bi contents of the first phases were added together in order to calculate the total Bi content included in the first phase.

Meanwhile, the composition of the second phase included in the abovementioned 100 particles was analysed. 10 or more measurement points were set for a single second phase. The Bi content included in the second phase was calculated by multiplying the mean value of the Bi concentration (atomic concentration) at the measurement points in the single second phase by the surface area of said single second phase in which the measurement points were included. The Bi content was then calculated for each second phase included in the abovementioned 100 particles and the Bi contents of the second phases were added together in order to calculate the total Bi content included in the second phase.

The total Bi content of the first phase with respect to the total Bi content of the second phase (β) was then calculated.

Dielectric Constant ε1

The dielectric constant ε1 (no units) of the laminated ceramic capacitor obtained was calculated from the capacitance measured from conditions of room temperature at 25° C., frequency 1 kHz, input signal level (measurement voltage) 1.0 Vrms, and distance between electrodes of the laminated ceramic capacitor and effective surface area of the electrodes, using a digital LCR meter (Hewlett-Packard; 4284A).

Dielectric Constant ε2

The dielectric constant ε2 (no units) was calculated from the capacitance measured from conditions of room temperature at 25° C., frequency 1 kHz, and input signal level (measurement voltage) 1.0 Vrms, effective surface area of the electrodes and distance between electrodes, while a DC bias generator (GLASSMAN HIGH VOLTAGE; WX10P90) was connected to a digital LCR meter (Hewlett-Packard; 4284A) and a DC bias of 5 V/μm was applied to evaluation samples. A higher value for the dielectric constant ε2 is preferable, and a value of 1000 or greater was deemed to be good and a value of 1300 or greater was deemed to be even better in the present exemplary embodiments.

DC Bias Characteristics

The DC bias characteristics were calculated by means of the following formula (2) using the dielectric constant ε1 and the dielectric constant ε2. A smaller absolute value for the DC bias characteristics is preferable, and a value of −20% to +20% was deemed to be good and a value of −15% to +15% was deemed to be even better in the present exemplary embodiments.

$$DC \text{ bias characteristics } (\%) = 100 \times (\varepsilon_2 - \varepsilon_1)/\varepsilon_1 \quad \text{Formula (2)}$$

High-Temperature Load Lifespan

The high-temperature load lifespan was evaluated using a thermostatic bath and a digital ultra-high resistance meter (ADVANTEST; R8340A), by maintaining a state of DC voltage application under an electric field of 50 V/μm at 150° C. and measuring the lifetime. In the present exemplary embodiments, the lifespan was defined as the time from the start of application until the insulation resistance fell to a single digit. Furthermore, this evaluation was carried out for 10 capacitor samples and the mean value thereof was taken as the high-temperature load lifespan. A value of 20 hours or greater was deemed to be good and a value of 25 hours or greater was deemed to be even better in the present exemplary embodiments.

Transverse Rupture Strength

The method for measuring the transverse rupture strength will be described in detail below.

1 part by weight of polyvinyl alcohol (PVA) was added to 100 parts by weight of calcined powder, the resulting material was moulded under a pressure of 196-490 MPa and square plate-shaped moulded articles having planar dimensions of the order of length 20 mm, width 20 mm and thickness 1 mm were obtained.

The resulting square plate-shaped moulded articles were baked under the air at a baking temperature of 900-1100° C. for a baking time of 2-10 hours in order to obtain sintered compact samples. When the density of the resulting sintered compact samples was measured, it was found that the density of all of the samples was 95% or greater with respect to the theoretical density.

The sintered compact samples obtained were processed to a length of 7.2 mm, a width of 2.5 mm and a thickness of 0.32 mm using a double-sided lapping machine and a dicing saw, and 20 samples for transverse rupture strength measurement were obtained for each sample. The maximum load (N) when the samples for transverse rupture strength measurement were broken by three-point bending by means of machine model 5543 produced by INSTRON with a distance between support points of 5 mm was measured for each of the 20 samples and the transverse rupture strength was calculated. A higher transverse rupture strength is preferable, and a value of 160 MPa or greater was deemed to be good and a value of 170 MPa or greater was deemed to be even better in the present exemplary embodiments.

TABLE 1

| Sample no. | Molar ratio α of Bi with respect to Sr | Auxiliary component Type | Auxiliary component Amount (molar parts) | Surface area of first phase with respect to surface area of particle as a whole | (Bi in first phase)/ (Bi in second phase) β | Dielectric constant ε1 | Dielectric constant ε2 | DC bias characteristics (%), application of 5 V/μm | High-temperature load lifespan (h) 150° C.-50 V/μm | Transverse rupture strength (MPa) |
|---|---|---|---|---|---|---|---|---|---|---|
| Exemplary Embodiment 1 | 0.17 | La | 3.3 | 0.1 | 2.40 | 1150 | 1090 | −5.2 | 33 | 275 |
| Exemplary Embodiment 2 | 0.23 | La | 3.3 | 0.8 | 2.15 | 1430 | 1332 | −6.9 | 31 | 270 |
| Exemplary Embodiment 3 | 0.33 | La | 3.3 | 1.8 | 1.97 | 2022 | 1859 | −8.1 | 30 | 274 |
| Exemplary Embodiment 4 | 0.50 | La | 3.3 | 3.0 | 1.90 | 2448 | 2307 | −5.8 | 30 | 261 |
| Exemplary Embodiment 5 | 0.69 | La | 3.3 | 4.9 | 1.50 | 2234 | 2016 | −9.8 | 28 | 232 |
| Exemplary Embodiment 6 | 1.08 | La | 3.3 | 6.1 | 1.44 | 2263 | 2076 | −8.3 | 27 | 215 |
| Exemplary Embodiment 7 | 1.17 | La | 3.3 | 8.5 | 1.30 | 2263 | 2300 | 1.6 | 26 | 177 |
| Exemplary Embodiment 8 | 2.00 | La | 3.3 | 9.4 | 1.24 | 1783 | 1895 | 6.3 | 26 | 175 |

TABLE 1-continued

| Sample no. | Molar ratio α of Bi with respect to Sr | Auxiliary component Type | Auxiliary component Amount (molar parts) | Surface area of first phase with respect to surface area of particle as a whole | (Bi in first phase)/ (Bi in second phase) β | Dielectric constant ε1 | Dielectric constant ε2 | DC bias characteristics (%), application of 5 V/μm | High-temperature load lifespan (h) 150° C.-50 V/μm | Transverse rupture strength (MPa) |
|---|---|---|---|---|---|---|---|---|---|---|
| Exemplary Embodiment 9 | 2.47 | La | 3.3 | 13.2 | 1.15 | 1717 | 1720 | 0.2 | 25 | 173 |
| Exemplary Embodiment 10 | 2.83 | La | 3.3 | 15.0 | 1.10 | 1607 | 1615 | 0.5 | 21 | 166 |
| Exemplary Embodiment 11 | 0.50 | Nd | 3.3 | 4.2 | 1.86 | 2280 | 2165 | −5.0 | 31 | 238 |
| Exemplary Embodiment 12 | 0.50 | Sm | 3.3 | 4.0 | 1.73 | 2125 | 2040 | −4.0 | 32 | 240 |
| Exemplary Embodiment 13 | 0.50 | Gd | 3.3 | 3.3 | 1.79 | 2240 | 2065 | −7.8 | 32 | 250 |
| Exemplary Embodiment 14 | 0.52 | Mg | 0.5 | 3.6 | 1.05 | 3456 | 2840 | −17.8 | 22 | 264 |
| Exemplary Embodiment 15 | 0.72 | Mg | 5.3 | 5.5 | 1.53 | 2374 | 2664 | 12.2 | 31 | 230 |
| Exemplary Embodiment 16 | 2.00 | Mg | 11.1 | 9.0 | 1.10 | 1796 | 1817 | 1.2 | 22 | 210 |
| Exemplary Embodiment 17 | 0.72 | Zn | 5.3 | 5.8 | 1.34 | 2118 | 1854 | −12.5 | 31 | 263 |
| Exemplary Embodiment 18 | 0.63 | Ca | 10.0 | 6.0 | 1.30 | 1880 | 1608 | −14.5 | 30 | 215 |
| Comparative Example 1 | 0.13 | La | 3.3 | 0.0 | 2.62 | 1025 | 950 | −7.3 | 37 | 289 |
| Comparative Example 2 | 0.50 | None | 0.0 | 8.7 | 1.23 | 4666 | 2414 | −48.3 | 22 | 163 |
| Comparative Example 3 | 4.50 | None | 0.0 | 17.0 | 1.02 | 1027 | 502 | −51.1 | 12 | 140 |

It can be seen from the above that the dielectric compositions according to Exemplary Embodiments 1-18 include particles having a perovskite crystal structure including at least Bi, Na, Sr and Ti. Furthermore, the molar ratio α of Bi with respect to Sr satisfies 0.17≤α≤2.83. In addition, the auxiliary component is included in an amount of between 0.5 molar parts and 11.1 molar parts, taking the Ti content of the dielectric composition as 100 molar parts. Furthermore, at least some of the particles comprise a high-Bi phase having a Bi concentration of at least 1.2 times the mean Bi concentration of the dielectric composition as a whole. In addition, the total of the surface area of the high-Bi phase satisfies a value between 0.1% and 15% of the total surface area of the particles as a whole. The dielectric compositions according to Exemplary Embodiments 1-18 demonstrated a dielectric constant ε2 when a DC bias of 5 V/μm was applied of 1000 or greater, DC bias characteristics of −20% to +20%, a high-temperature load lifespan at 50 V/μm under a temperature of 150° C. of 20 hours or greater, and a transverse rupture strength of 160 MPa or greater.

Furthermore, the dielectric compositions according to Exemplary Embodiments 2-9, 11-13, 15 and 17-18, in which the total amount of Bi included in the first phase is, as an atomic ratio, between 1.15 times and 2.15 times the total amount of Bi included in the second phase (1.15≤β≤2.15) demonstrated a dielectric constant ε2 when a DC bias of 5 V/μm was applied of 1300 or greater, DC bias characteristics within ±15%, a high-temperature load lifespan at 50 V/μm under a temperature of 150° C. of 25 hours or greater, and a transverse rupture strength of 170 MPa or greater.

In contrast to this, the dielectric compositions according to Comparative Examples 1-3 in which α<0.12 or α>1.99, the auxiliary component content is less than 0.5 molar parts or greater than 11.1 molar parts, or the total surface area of the high-Bi phase is less than 0.1% or greater than 15% with respect to the total surface area of the particles as a whole demonstrated a dielectric constant ε2 when a DC bias of 5 V/μm was applied of less than 1000, DC bias characteristics outside the range of −20% to +20%, a high-temperature load lifespan at 50 V/μm under a temperature of 150° C. of less than 20 hours, or a transverse rupture strength of less than 160 MPa.

The invention claimed is:
1. A dielectric composition comprising:
   particles having a perovskite crystal structure including at least Bi, Na, Sr and Ti; and
   at least one element selected from the group consisting of La, Ce, Pr, Nd, Sm, Eu, Gd, Tb, Dy, Ho, Yb, Ba, Ca, Mg and Zn,
   wherein a content of the at least one element selected from the group consisting of La, Ce, Pr, Nd, Sm, Eu, Gd, Tb, Dy, Ho, Yb, Ba, Ca, Mg and Zn is between 0.5 molar parts and 11.1 molar parts, taking a Ti content of the dielectric composition as 100 molar parts,
   wherein 0.17≤α≤2.83, where α is a molar ratio of Bi with respect to Sr in the dielectric composition, wherein at least some of the particles include a high-Bi phase having a Bi concentration of at least 1.2 times a mean Bi concentration of the dielectric composition as a whole, and wherein a total surface area of a high-Bi phase within the particles in a cross section of the dielectric composition is between 0.1% and 15% of a total surface area of the particles.

2. The dielectric composition according to claim 1, wherein a total content of Bi included in the high-Bi phase within the particles is, as an atomic ratio, between 1.15 and 2.15 times a total content of Bi included in a portion within the particles outside the high-Bi phase.

3. A dielectric element comprising the dielectric composition according to claim 1.

4. An electronic component comprising a dielectric layer including the dielectric composition according to claim 1.

5. A laminated electronic component comprising:
a laminated portion formed by alternately laminating an internal electrode layer and a dielectric layer comprising the dielectric composition according to claim 1.

6. A single-layer ceramic capacitor comprising:
a disc-shaped dielectric body comprising the dielectric composition according to claim 1; and
a pair of electrodes arranged on both surfaces of the dielectric body.

7. The single-layer ceramic capacitor according to claim 6, wherein a material of the electrodes comprises Cu.

8. A laminated ceramic capacitor comprising the laminated electronic component according to claim 5, wherein the internal electrode layers are stacked such that end surfaces thereof are alternately exposed at surfaces of two opposing ends of the laminated electronic component.

9. The laminated ceramic capacitor according to claim 8, wherein the internal electrode layers comprise Cu or Cu alloy.

10. The laminated ceramic capacitor according to claim 8, wherein a pair of external electrodes is arranged at both ends of the laminated electronic component, and wherein the pair of external electrodes is connected to exposed end surfaces of the internal electrode layers.

11. The laminated ceramic capacitor according to claim 10, wherein the external electrodes comprise Cu.

12. A method for providing a laminated ceramic capacitor, the method comprising:
providing a dielectric starting material form powders of bismuth oxide ($Bi_2O_3$), sodium carbonate ($Na_2CO_3$), strontium carbonate ($SrCO_3$) and titanium oxide ($TiO_2$);
preparing a green chip using a sheet method or a printing method employing a paste for dielectric layers and a paste for internal electrodes, wherein the paste for the dielectric layers is an organic paint comprising a mixture of the dielectric starting material and an organic vehicle or wherein the paste for the dielectric layers is an aqueous paint comprising a mixture of the dielectric starting material and an aqueous vehicle;
performing a debinding treatment of the green chip;
baking the green chip thereby forming a dielectric composition;
printing or transcribing external electrodes on the dielectric composition; and
baking the dielectric composition comprising a dielectric composition,
wherein the dielectric starting material is weighed out such that the dielectric composition comprises particles having a perovskite crystal structure including at least Bi, Na, Sr and Ti,
wherein the dielectric composition includes at least one element selected from the group consisting of La, Ce, Pr, Nd, Sm, Eu, Gd, Tb, Dy, Ho, Yb, Ba, Ca, Mg and Zn,
wherein a content of the at least one element selected from the group consisting of La, Ce, Pr, Nd, Sm, Eu, Gd, Tb, Dy, Ho, Yb, Ba, Ca, Mg and Zn is between 0.5 molar parts and 11.1 molar parts, taking a Ti content of the dielectric composition as 100 molar parts,
wherein $0.17 \leq \alpha \leq 2.83$, where $\alpha$ is a molar ratio of Bi with respect to Sr in the dielectric composition,
wherein at least some of the particles include a high-Bi phase having a Bi concentration of at least 1.2 times a mean Bi concentration of the dielectric composition as a whole, and
wherein a total surface area of the high-Bi phase within the particles in a cross section of the dielectric composition is between 0.1% and 15% of the total surface area of the particles.

13. The method according to claim 12, further comprising:
preparing the paste for the internal electrodes by mixing a conductive material comprising metals such as Au, Pt, Ag, Ag—Pd alloy, Cu or Ni, or various types of oxide which form the conductive material after baking, organometallic compounds, or resinates with the organic vehicle; and
preparing a paste for the external electrodes in the same way as the paste for the internal electrodes.

14. The method according to claim 12, wherein the dielectric starting material further comprises a powder from barium carbonate ($BaCO_3$), calcium carbonate ($CaCO_3$), magnesium carbonate ($MgCO_3$), zinc oxide ($ZnO$), lanthanum hydroxide ($La(OH)_3$), neodymium oxide ($Nd_2O_3$), samarium oxide ($Sm_2O_3$) or gadolinium oxide ($Gd_2O_3$).

* * * * *